Jan. 28, 1958  A. R. WEINRICH ET AL  2,821,115
REAR VIEW MIRROR MOUNTING
Filed May 27, 1949  3 Sheets-Sheet 3

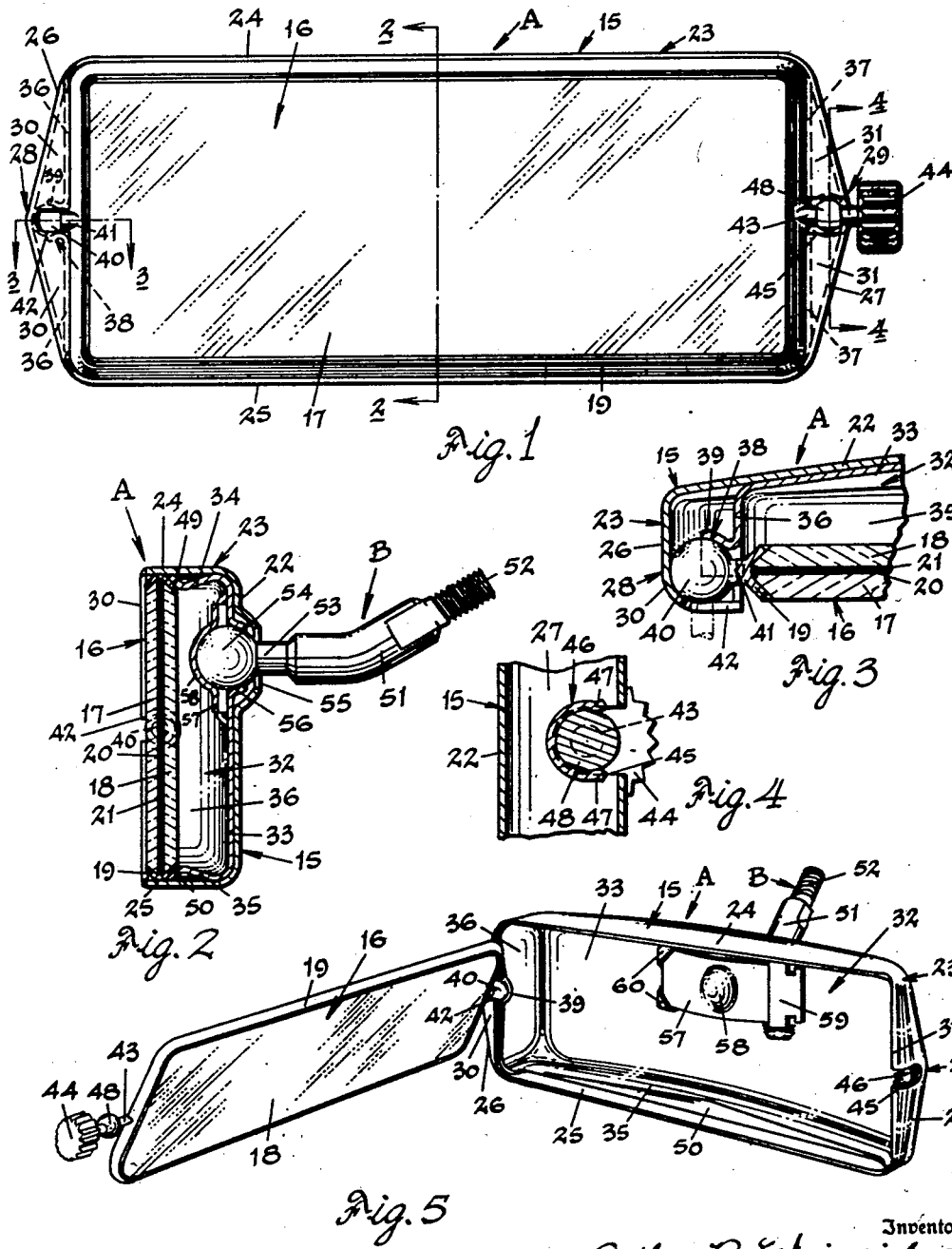

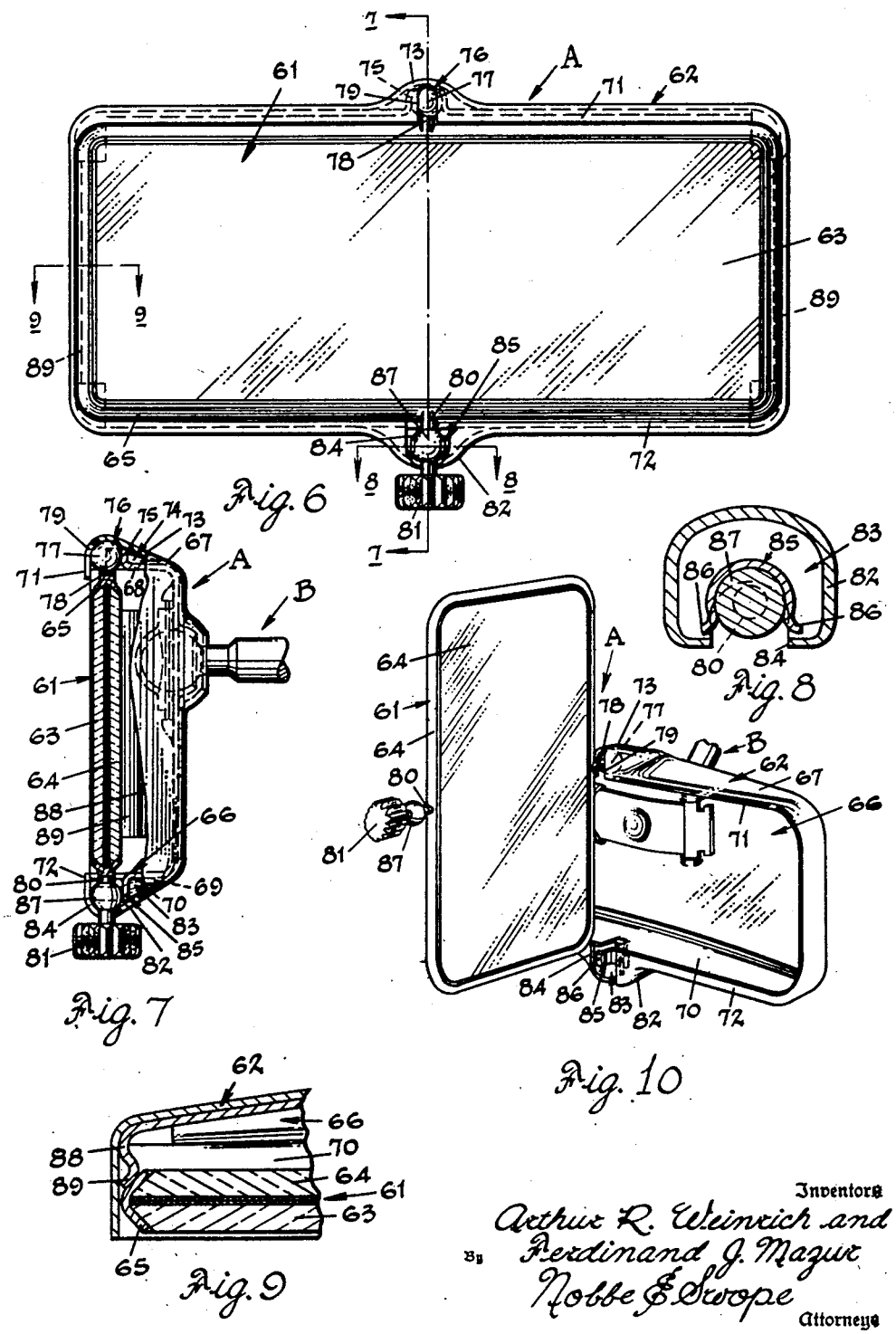

Inventors
Arthur R. Weinrich and
Ferdinand J. Mazur
By Nobbe & Swope
Attorneys

United States Patent Office 2,821,115
Patented Jan. 28, 1958

2,821,115

REAR VIEW MIRROR MOUNTING

Arthur R. Weinrich, Brackenridge, and Ferdinand J. Mazur, Natrona Heights, Pa., assignors to Libbey-Owens-Ford Glass Company, Toledo, Ohio, a corporation of Ohio Application May 27, 1949, Serial No. 95,724

2 Claims. (Cl. 88—77)

The present invention relates to rear view mirrors such as employed in automobiles and the like, of the character which enables the driver of the vehicle to have a clear view of the rear road conditions at all times.

More particularly, this invention has to do with that type of rear view mirror having two reflective surfaces of different reflecting power and being reversible so that either surface may be brought into operative position by the driver of the vehicle; one reflective surface being in the form of an ordinary mirror for use in day driving and the other providing a mirror for night driving which will reduce the brilliancy of the reflecting headlights of an automobile approaching from the rear.

A primary object of the invention is the provision of a rear view mirror of the above type embodying means of a novel and improved character which will enable the driver to reverse the mirror in a rapid, efficient manner and with a minimum of care and attention on his part.

Another object of the invention is the provision of a rear view mirror embodying a supporting housing or case with which the mirror proper is both hingedly and rotatably associated so that it is capable of being readily reversed to selectively bring either of the reflecting surfaces into the line of vision of the driver depending upon whether the mirror is to be used for day driving or night driving.

Another object of the invention is the provision of a rear view mirror assembly embodying a case open at the front thereof, a mirror unit closing the front of the case when in normal operating position, and means for hingedly and rotatably connecting the mirror unit to the case so that the said mirror unit can be swung freely from the case, reversed, and returned to operative position with respect to the case by the driver of the vehicle both quickly and easily.

A further object of the invention is the provision of such a rear view mirror assembly embodying cooperative means carried by the case and mirror unit for properly locating the mirror unit in normal operating position with respect to the case and for preventing accidental displacement thereof.

A still further object of the invention is the provision of a rear view mirror assembly of the above character in combination with means for supporting the same upon the structure of a vehicle for bodily adjustment relative to its supporting structure to bring the mirror unit to any desired angular position to accommodate persons of different height and seating position.

Other objects and advantages of the invention will become more apparent during the course of the following description, when taken in connection with the accompanying drawings.

In the drawings, wherein like numerals are employed to designate like parts throughout the same:

Fig. 1 is a front elevation of a rear view mirror constructed in accordance with the invention;

Fig. 2 is a vertical transverse section taken substantially on line 2—2 of Fig. 1;

Fig. 3 is a horizontal section taken substantially on line 3—3 of Fig. 1;

Fig. 4 is a vertical section taken substantially on line 4—4 of Fig. 1;

Fig. 5 is a perspective view of the rear view mirror showing the mirror unit partially reversed;

Fig. 6 is a front elevation of a modified form of rear view mirror also embodying the invention;

Fig. 7 is a vertical transverse section taken substantially on line 7—7 of Fig. 6;

Fig. 8 is a horizontal section taken substantially on line 8—8 of Fig. 6;

Fig. 9 is a horizontal section taken substantially on line 9—9 of Fig. 6;

Fig. 10 is a perspective view of the modified form of rear view mirror showing the manner in which the mirror unit is reversed;

Figure 11:
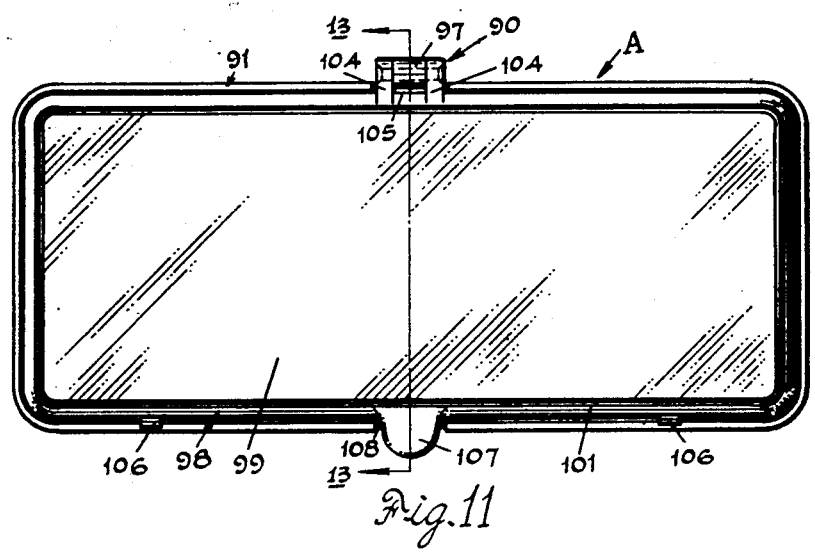
Fig. 11 is a front elevation of a further modified form of rear view mirror embodying the invention.

Referring now to the drawings and particularly to Figs. 1 to 5 inclusive, there is shown a rear view mirror assembly, constructed in accordance with the invention, and which is designated in its entirety by the letter A. The mirror assembly A comprises generally a case 15, which may be adjustably supported on a conventional mounting means B and a reversible mirror unit 16 carried by the case 15.

Although the invention is not limited to the use of any specific type of reversible mirror unit 16, it may be composed, as herein shown, of two mirror elements 17 and 18 arranged back to back and carried in a bezel 19. The mirror elements 17 and 18 have the inner, adjacent surfaces thereof provided with reflective coatings 20 and 21 respectively of different reflecting values, with one mirror coating being highly reflecting and suitable for daytime driving, and the other mirror coating having a lower reflecting value suitable for night time driving.

The bezel 19 of mirror unit 16 is supported for universal movement by the case 15. The case is substantially rectangular and includes a rear wall 22 having a forwardly bent peripheral flange 23 comprising a top wall 24, bottom wall 25 and opposite end walls 26 and 27. The end walls 26 and 27 are formed to extend outwardly from the top wall 24 and bottom wall 25 to the apices 28 and 29 respectively which are arranged along the longitudinal axis of the case. The end walls 26 and 27 are also formed with inwardly directed triangular front walls 30 and 31 respectively, which cover substantially triangular areas at the opposite ends of the case.

Mounted within the case 15 is a liner plate 32 which closely approximates the shape of the case, with the rear wall 33 and top and bottom walls 34 and 35 of the liner plate being received in close, contacting relation against the corresponding walls 22, 24 and 25 of the case. The end walls 36 and 37 of the liner plate are disposed at substantially right angles to the top wall 34 and bottom wall 35 and the edges thereof are engaged by the front walls 30 and 31 of the case to thus enclose the triangular spaces between the end walls 26 and 27 of the case and the end walls 36 and 37 of the liner plate.

Formed in the end of the case 15 at the apex 28 thereof is a spherical socket 38 defined by a bearing seat 39 on the liner plate 32 and the cooperating front wall 30 of the case. Rotatably mounted within the socket 38 is the ball end 40 of a supporting shank 41 for the bezel 19 of the mirror unit as shown in Fig. 3. The front wall 30 of the case is slotted as at 42 to receive the shank 41 when the mirror unit 16 is swung outwardly from or returned to the case 15. The association of the seat 39 and front wall 30 of the case, in creating the bearing socket 38 for the ball 40, provides a universal type of support for the mirror unit whereby it can be swung forwardly in a substantially horizontal plane from the case 15, as illustrated in Fig. 5, and then rotated on said ball to reverse the positions of the mirror elements 17 and 18 so as to locate the desired mirror element in viewing position.

In order to facilitate swinging movement of the mirror unit relative to the case, a shank 43 is secured to the bezel 19 diametrically opposite the shank 41 and has secured to the end thereof a hand knob 44 or other suitable finger piece. When the mirror unit is in its normally closed position, the shank 41 is received in a slot 45 provided in the end wall 27 of the case at the apex 29 thereof, and is held in such closed or operative position by a clamping member 46 as shown in Fig. 4.

The clamping member 46 is preferably struck from the end wall 37 of liner plate 32 and is located in the apex 29 of the end wall 27 of the case in alignment with the slot 45 formed therein. The clamp is substantially C-shape and its free ends 47 are directed slightly inwardly to frictionally engage an enlargement 48 which is formed on the shank 43 intermediate the bezel and the hand knob 44. In removing the mirror unit from the case, the enlarged portion 48 of the shank is withdrawn from between the ends 47 of the clamp 46 and is carried outwardly through the slot 45 in the case. When returning the mirror unit to closed position with respect to the case, the ends 47 of the clamp 46 spring apart so that the enlarged portion 48 will enter therebetween and be firmly engaged thereby.

As shown, the top wall 34 and bottom wall 35 of the liner plate are shaped to form shoulders 49 and 50 respectively which constitute abutting surfaces or stops against which the bezel is urged when the mirror unit is returned to the case. The bezel is engaged along both its upper and lower edges so that either of the shoulders will urge the mirror unit into proper position with respect to the same.

In operation, and when it is desired to reverse the positions of the mirror elements 17 and 18, the driver of the vehicle simply grasps the hand knob 44 and pulls the same forwardly to release the enlarged portion 48 of the shank 43 from the gripping action of the clamping member 46 and thus swing the mirror unit outwardly with respect to the case upon the ball 40 as in Fig. 5. As the shank 43 moves from the slot 45, the oppositely disposed shank 41 will be carried into the slot 43 in the front wall 30. After having swung the mirror unit forwardly in a substantially horizontal direction on the ball 40 until it is clear of the case 15, the driver can rotate the mirror unit on said ball, in either direction, to bring the desired mirror element into operative position. In fact, the forward swinging movement of the mirror unit and the rotation thereof can be accomplished substantially simultaneously by the driver quickly and easily. When the desired mirror element has been brought to operative position, the bezel is swung in the opposite direction upon ball 40 until the shank 43 enters slot 45 and the enlarged portion 48 is reengaged by the clamping member 46. Simultaneously, the upper and lower edges of the bezel abut the shoulders 49 and 50 on liner plate 32 to properly locate the mirror unit within the case and present the desired mirror element to the driver.

Another important feature of the rear view mirror herein provided is that the rear wall 22 of the case 15 acts as a cover for the mirror surface facing said rear wall to shield the same from the headlights of oncoming vehicles and thereby prevent incidental reflections in the windshield of the vehicle created by oncoming traffic. Thus, the out-of-vision reflecting surface is normally in a position to receive light rays that may originate in approaching car lights, sunlight, and reflections from either source. These light rays can and will, unless the mirror is shielded therefrom, be reflected back toward the windshield of the vehicle and create disturbing sources of conflicting light or areas of scattered light therefrom which may materially interfere with driving safety and comfort. The rear wall 22 of the case in serving as a cover for the adjacent reflecting surface of the mirror prevents such incidental reflections.

The mirror assembly A is ordinarily adjustably mounted within an automobile, or other vehicle, so that the viewing field thereof can be readily observed by the driver according to his individual height and seating position. Any conventional or preferred type of mirror mounting means may be employed. By way of example, the mounting means B herein provided comprises an arm 51 having a threaded shank 52 for attaching the same to the frame of the vehicle. Opposite the threaded portion 52, the arm is formed to provide a shank 53 of reduced diameter and a terminal ball end 54. As herein illustrated, the shank 53 of the arm 51 extends through an opening 55 in the rear wall 22 of the case 15 and the ball end 54 is mounted in a spherical seat 56 formed in the liner plate 32 in alignment with the opening 55. The ball end 54 is retained in this seat by a metal strap 57 having a centrally formed bearing surface 58 conforming to and engaging said ball. The metal strap is suitably secured to the rear wall 33 of the liner plate as indicated at 59 and 60. The bearing surfaces 56 and 58 of the liner plate 32 and strap 57 coact to grip the ball end 54 of the arm 51 with sufficient frictional force to maintain the mirror assembly A stationary except when the same is to be bodily adjusted with respect to the ball.

While the embodiment of the invention, as hereinabove set forth, provides means for reversing the mirror elements by swinging the mirror unit in a substantially horizontal plane and then revolving the same, the reversal of the mirror unit may be effected in a somewhat different manner as illustrated in Figs. 6 to 10 inclusive. As therein shown, the rear view mirror assembly A is provided with suitably arranged means by which the mirror unit 61 can be swung in a vertical direction from its normal position within the case 62. The mirror unit 61 comprises the mirror elements 63 and 64 arranged in back to back relation and mounted in a bezel 65 that is supported within the case 62 so that the mirror unit can be rotated to reverse the said mirror elements and thus present the desired mirror element to the driver.

The case 62 and liner plate 66 mounted therein are modified from the previously described structure to make provision for supporting the mirror unit within their related top walls 67 and 68 respectively and to accommodate a clamping arrangement within the related bottom walls 69 and 70 thereof. The liner plate 66 is secured within the case 62 by inwardly extended marginal portions 71 and 72 which are bent from the top and bottom walls 67 and 69 respectively of the case and engage the edges of the top and bottom walls 68 and 70 respectively of the liner plate. The top wall 67 of the case is provided with a forwardly raising boss or the like 73 intermediate its ends to form and define a cavity 74 in which is located an upstanding semi-circular portion of the liner plate top wall 68 which provides a spherical seat 75. A bearing socket 76, in which is received the ball end 77 of the bezel shank 78, is formed in part by the spherical seat 75 and completed by the wall of the boss 73 and the inwardly bent marginal portion 71 of the case top wall 68.

The marginal portion 71 of the top wall of the case is slotted, as at 79, in alignment with the axis of the seat 75 to permit radial movement of the shank 78 when the mirror unit 61 is swung forwardly with respect to the case 62. A shank 80 extends from the bezel opposite the shank 76 and has secured to its outer end a hand knob or the like 81 for manipulating the mirror unit.

The bottom wall 69 of the case is also provided, intermediate its ends, with an enlarged portion or boss 82 to provide a cavity 83, and the marginal portion 72, bent inwardly from the bottom wall of the case, is slotted as at 84 to admit the shank 80 into the cavity. In the present instance, and as shown in Fig. 8, a clamping member 85 is bent downwardly from the bottom wall 70 of the liner plate 66 and is shaped to provide spaced fingers 86 which grip the enlarged portion 87 of the shank 80 when the mirror unit is moved into closed position with respect to the case.

In order to properly locate the mirror unit within the case, the end walls 88 of the liner plate 66 are suitably formed to provide shoulders 89 against which the bezel abuts.

The desired reversing of the mirror elements 63 and 64 is herein accomplished by gripping the knob 81 and pulling forwardly thereon to cause the mirror unit to swing outwardly and upwardly with respect to the case. When this is done, the enlarged portion 87 on shank 80 is released from the clamping member 85 as it moves from the slot 84 in the case and at the same time shank 78 is received in slot 79. Forward and upward movement of the mirror unit is continued until the mirror unit is free of the case whereupon the mirror unit is rotated upon the ball 77, as shown in Fig. 10, to reverse the positions of the mirror elements. In subsequently returning the mirror unit to the case, the knob 81 is pushed downwardly and rearwardly until the enlarged portion 87 of the shank 80 is engaged by the clamping member 85 and the bezel contacts the shoulders 89 to bring the mirror elements into proper viewing position and to retain them against accidental displacement.

Figure 12:
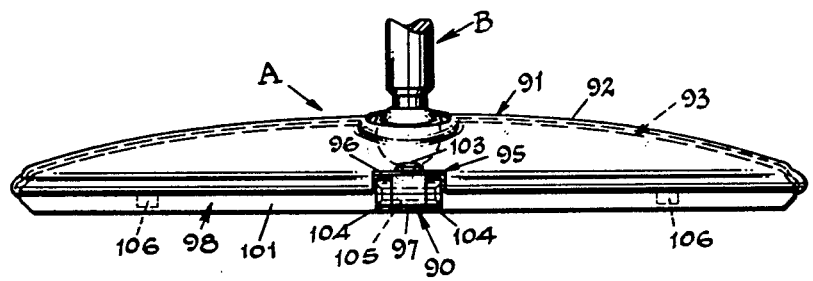
Fig. 12 is a top view thereof.
Figure 13:
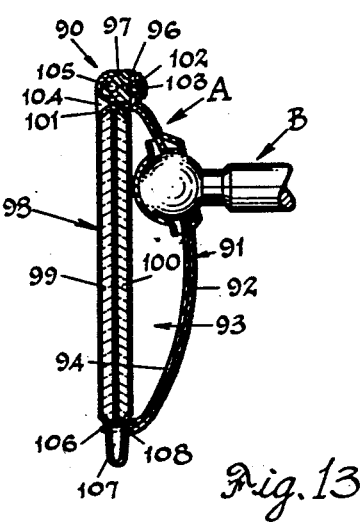
Fig. 13 is a vertical transverse section taken substantially on line 13—13 of Fig. 11.
Figure 14:
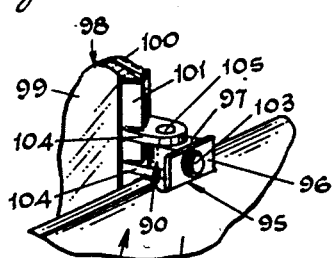
Fig. 14 is a fragmentary perspective view of the mirror with the mirror unit in a midway position of rotation.

A further modified construction embodying the invention is illustrated in the mirror assembly A, shown in Figs. 11 to 14 inclusive. This form of the invention contemplates the substitution of a swivel or hinge connection 90 for the ball and socket type of support for the mirror unit shown particularly in Figs. 6 to 10 inclusive.

As herein shown, the mirror assembly A comprises a case 91, the rear wall 92 of which is curved through both of its axes. The liner plate 93 mounted within the case 91 is correspondingly curved throughout its rear wall 94. The case and liner plate may be suitably secured together as by rolling the peripheral edges of the case over the adjoining edges of the liner plate. The upper edge of the case is notched, intermediate its ends as at 95, to receive an upstanding flange 96 struck from the liner plate. The flange 96 is drilled to provide a journal for the swivel block 97 by which the mirror unit 98 is hingedly and rotatably connected to the case 91. The mirror unit 98 may be formed, as above described, of two mirror elements 99 and 100 arranged back to back and carried in a bezel 101.

The swivel block 97 has an integrally formed shank 102 which passes through the opening in the flange 96 and has a head portion 103 which is upset to maintain the parts together. Carried by the bezel 101, intermediate the ends thereof, are spaced ears 104 which are located at opposite sides of the block 97 and hinged thereto by a pintle pin 105.

The liner plate 93 is provided in its bottom edge with a pair of latches 106 which extend forwardly beyond the case and also upwardly into contacting engagement with the bottom edge of the bezel when the mirror unit is moved to closed position. The latches are suitably bent to receive the bezel and to snap beneath its lower edge as it is removed from or returned to the case. The mirror unit is swung relative to the case by means of a hand gripping portion 107 which may be formed as an integral part of the bezel. To receive the gripping portion 107 when the mirror unit is moved to its closed position, the walls of the case 91 and liner plate 93 are provided with a notch 108. The hand grip 107 thus projects beyond the confines of the case 91 and can be easily grasped to swing the mirror unit forward about the pintle 105, out of engagement with the latches 106 and into a position in which it can be rotated on the shank 102 of the block 97.

When the desired mirror element has been selected by rotation of the bezel, it is swung downwardly until the hand gripping portion 107 enters the notch 108 and the latches 106 snap beneath the bezel to hold it firmly with respect to the case 91.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In a reversible rear view mirror for automobiles and the like, a supporting case including a rear wall provided with mounting means therefor and open at the front thereof, a mirror unit normally closing the front of said case and having two oppositely facing reflective surfaces of different reflecting values, and means swivelly connecting the mirror unit to the case at the top of the case and intermediate the ends thereof, comprising a vertical tab on the case, a block carried by the tab to rotate freely about a substantially horizontal axis, and means carried by the mirror unit and pivotally connected to the block so that the driver may swing said mirror unit outwardly on the block, rotate it by rotation of said block to present the desired reflecting surface to his vision, and return it to normal operating position with respect to the case, the rear wall of the case serving to shield the mirror from light rays emanating in front of the automobile.

2. In a reversible rear view mirror for automobiles and the like, a supporting case including a rear wall provided with mounting means therefor and open at the front thereof, a mirror unit normally closing the front of said case and having two oppositely facing reflective surfaces of different reflecting values, means swivelly connecting the mirror unit to the case at the top of the case and intermediate the ends thereof, comprising a vertical tab on the case, a block carried by the tab to rotate freely about a substantially horizontal axis, and means carried by the mirror unit and pivotally connected to the block so that the driver may swing said mirror unit outwardly on the block, rotate it by rotation of said block to present the desired reflecting surface to his vision, and return it to normal operating position with respect to the case, and means carried by the case at the bottom thereof and intermediate its ends and coacting with a part of the mirror unit for holding the latter against accidental movement relative to the case when in normal operating position, the rear wall of the case serving to shield the mirror from light rays emanating in front of the automobile.

References Cited in the file of this patent

UNITED STATES PATENTS

| | | |
|---|---|---|
| 1,763,550 | Beauchamp | June 10, 1930 |
| 2,066,982 | Kronquist | Jan. 5, 1937 |
| 2,087,531 | Sands | July 20, 1937 |
| 2,469,207 | Roedding | May 3, 1949 |

FOREIGN PATENTS

| | | |
|---|---|---|
| 461,855 | Great Britain | Feb. 25, 1937 |